US006187386B1

(12) United States Patent
Hundley

(10) Patent No.: US 6,187,386 B1
(45) Date of Patent: *Feb. 13, 2001

(54) LIQUID SEALANT COMPOSITION AND METHOD OF USING SAME

(75) Inventor: Joseph W. Hundley, 714 Circle Ct., Martinsville, VA (US) 24112

(73) Assignee: Joseph W. Hundley, Martinsville, VA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,245

(22) Filed: Oct. 7, 1997

Related U.S. Application Data

(63) Continuation of application No. 08/655,450, filed on May 30, 1996, now abandoned.

(51) Int. Cl.$^7$ ........................................................ B05D 3/02
(52) U.S. Cl. ........................ 427/393.6; 427/154; 427/136
(58) Field of Search ................................ 524/423, 425, 524/430, 475, 478, 480, 487, 488, 489; 427/136, 154, 393.6

(56) References Cited

U.S. PATENT DOCUMENTS

| | | |
|---|---|---|
| 3,994,827 | 11/1976 | Sakai et al. . |
| 4,094,694 * | 6/1978 | Long ................................. 524/405 X |
| 4,097,437 * | 6/1978 | Dhake ................................. 524/236 |
| 4,324,781 | 4/1982 | Okamoto et al. . |
| 4,386,183 * | 5/1983 | Wempe ............................. 524/245 X |
| 4,389,446 | 6/1983 | Blom et al. . |
| 4,397,913 * | 8/1983 | Fahey ..................................... 428/369 |
| 4,421,839 | 12/1983 | Takiguchi et al. . |
| 4,460,737 | 7/1984 | Evans et al. . |
| 4,539,047 | 9/1985 | Crockatt et al. . |
| 4,561,989 | 12/1985 | Wada et al. . |
| 4,656,039 | 4/1987 | Weiss et al. . |
| 4,716,060 | 12/1987 | Rajadhysksha et al. . |
| 4,748,196 * | 5/1988 | Kuroda et al. .................... 524/489 X |
| 4,818,588 | 4/1989 | Okabe et al. . |
| 5,098,943 * | 3/1992 | Tagawa et al. ................... 524/489 X |
| 5,143,949 * | 9/1992 | Grogan et al. ....................... 524/44 X |
| 5,330,795 | 7/1994 | Batdorf et al. . |
| 5,437,722 * | 8/1995 | Borenstein ........................ 524/489 X |
| 5,454,898 * | 10/1995 | Krankkala ........................... 524/53 X |
| 5,506,290 * | 4/1996 | Shapero ............................ 524/487 X |
| 5,604,282 * | 2/1997 | Grogan et al. .................... 524/487 X |
| 5,631,042 * | 5/1997 | Becker et al. ....................... 427/154 |

FOREIGN PATENT DOCUMENTS

| | | | |
|---|---|---|---|
| 0011850 * | 3/1974 | (JP) | ...................................... 524/487 |
| 0020009 * | 2/1979 | (JP) | ...................................... 524/487 |

OTHER PUBLICATIONS

Technical Data Bulletin; Dupont ; pp. 1–2; H 1–1041 Jan. 29, 1948.*

"Standard Specification for Liquid Membrane–Forming Compounds for Curing Concrete", Annual Book of ASTM Standards, vol. 06.01.

* cited by examiner

Primary Examiner—Judy M. Reddick
(74) Attorney, Agent, or Firm—Larson & Taylor, PLC

(57) ABSTRACT

An aqueous coating composition for coating concrete-like materials to prevent loss of water vapor during hardening. The aqueous coating composition comprises 5.0–45.0% by weight of a wax or wax-like material, 1.0–10.0% by weight of polyvinyl alcohol, 0–1.0% by weight of a biocide and the balance of water. Also disclosed is a method of coating a concrete-like material including the step of applying, to the surface of the concrete-like material a coating of the aqueous coating composition of the invention. Also disclosed is an article of manufacture which includes a concrete-like material having applied thereto a coating as described above. The aqueous coating composition surprisingly meets the relevant ASTM and other standards for concrete curing without employing any hazardous materials and/or volatile organic compounds.

14 Claims, No Drawings

LIQUID SEALANT COMPOSITION AND METHOD OF USING SAME

This application is a continuation of application Ser. No. 08/655,450, filed May 30, 1996, now abandoned.

BACKGROUND OF THE INVENTION

1. Field of the Invention

The present invention relates to a liquid sealant composition for application to materials such as concrete which rely upon hydration reactions for curing in order to prevent loss of water during the curing process. This allows the material to develop maximum strength and wear resistance during curing. The present invention also relates to a method of applying a liquid coating composition to a material such as concrete which relies upon hydration for curing in order to reduce or prevent water loss therefrom.

2. Description of the Prior Art

Wax emulsions made with fatty acids are known for use as sealants for the purpose of sealing against liquid water. However, such wax emulsions do not prevent passage of water vapor and therefore do not adequately seal in the moisture of hydration of concrete. An example of such a compound is Mastercure® W which has been taken off the market since it is relatively ineffective in preventing loss of water vapor from concrete during curing.

Several products exist which meet the ASTM specification C 309-95 for liquid membrane-forming compounds for curing concrete. Typical products used for this purpose are primary epoxy compounds and urethanes. However, these compositions suffer from the problem that they contain hazardous components such as volatile organic compounds.

Although polyvinyl alcohol is known as both a film-forming agent and an emulsifier, it does not meet ASTM standard C 309-95 when tested as a liquid membrane-forming compound for curing concrete. The reason for this is that although polyvinyl alcohol typically exhibits a low permeability to gases, it does not exhibit a low permeability to either ammonia or water vapor. As a result, polyvinyl alcohol is insufficient to prevent significant loss of water from concrete during curing.

Paraffinic compounds are known to be water repellant and thus paraffin is typically used as a component of wood preservative agents. For example, U.S. Pat. No. 4,389,446 discloses a composition useful as a wood preservative agent which includes an organic solvent, solid paraffin as a water repellant agent and a biocide.

U.S. Pat. No. 4,539,047 relates to clear coatings for preventing wood from discoloring as a result of exposure to ultraviolet rays. A coating composition which includes an unsaturated oil-containing resin dissolved in a solvent medium containing at least 50% of mineral spirits which has dispersed therein from about 13 to about 63 parts of granulated paraffin wax and from 0.5–20 parts of transparent ultraviolet-absorbing pigment per 100 parts of the resin, is disclosed for this purpose.

However, paraffin based coatings are not typically employed as liquid membrane-forming compounds for curing concrete since they suffer from a number of disadvantages. In particular, paraffin wax would be difficult to remove once the concrete is completely cured. Further, paraffin wax would be difficult to apply since it must be heated to melting prior to application. Further, paraffin wax does not form a strong film and it can be very messy particularly if it is employed in warm climates.

Accordingly, there remains a need in the art for a coating composition which can be used as a coating compound for the curing of concrete and other materials which rely on a hydration reaction for hardening.

There is also a need in the art for coating compounds for the curing of concrete and other similar materials which does not contain hazardous materials and/or volatile organic compounds.

These and other objects of the present invention will be apparent from the summary and detailed descriptions which follow.

SUMMARY OF THE INVENTION

In a first aspect, the present invention relates to an aqueous composition for use as a coating for application to materials which undergo a hydration reaction during hardening in order to reduce the loss of water vapor during the hardening period. The aqueous composition includes 1.0–10.0% by weight of polyvinyl alcohol, 5.0–45.0% by weight of a hydrocarbon wax, 0–1.0% by weight of a biocide, and the balance of water. All weight percentages are based on the total weight of the composition.

The aqueous composition of the present invention provides the unexpected advantage that it meets the ASTM specification C 309-95 for liquid membrane-forming compounds for curing concrete and it does not contain any hazardous materials and/or volatile organic compounds.

In an alternative embodiment, the aqueous composition of the present invention may optionally contain a light-reflective material such that the coating composition exhibits sufficient daylight reflectance to meet the ASTM C 309-95 specification for type 2 liquid membrane forming compounds. Such compositions are employed to reduce solar heating due to ultraviolet rays.

In a second aspect, the present invention relates to a method of coating a material which undergoes a hydration reaction during hardening in order to reduce the loss of water vapor from the material during hardening. The method comprises the step of applying, to an uncured concrete-like material, a coating of an aqueous composition which comprises 1.0–10.0% by weight of polyvinyl alcohol, 5.0–45.0% by weight of hydrocarbon wax, and the balance of water.

In preferred methods, the coating composition further includes a light reflective pigment, a filler and/or up to 1.0% by weight of a biocide.

In a third aspect, the present invention also relates to an article of manufacture which comprises a material which undergoes an hydration reaction during hardening and having applied thereto a sufficient amount of a coating to reduce the loss of water vapor from the material. The coating comprises 1.0–10.0% by weight of polyvinyl alcohol, 5.0–45.0% by weight of a hydrocarbon wax and the balance water.

The composition, article of manufacture and method of the present invention surprisingly provide a concrete sealant material which meets ASTM specification C 309-95 and does not contain any hazardous materials and/or volatile organic compounds.

DETAILED DESCRIPTION OF THE PREFERRED EMBODIMENTS

The compositions of the invention generally comprise at least one hydrocarbon wax dispersed in an aqueous emulsion which can form a film on a concrete-like substrate. The emulsions used in the composition of the present invention are preferably made using polyvinyl alcohol as the emulsifying agent. Thus, in its broadest form, the present invention relates to an aqueous composition comprising a hydrocarbon wax, a polyvinyl alcohol emulsifying agent, and the balance of water.

The aqueous composition of the present invention is designed for use as a coating for application to materials which undergo a hydration reaction during hardening. The purpose of the coating of the present invention is to reduce the loss of water vapor from the material during the hardening period. In this manner, it is ensured that the maximum amount of water remains available for the hydration reaction whereby the material hardens to the desired hardness and durability.

Typical materials to which the aqueous coating composition of the present invention may be applied include materials such as concrete, gypsum-based products, plaster of paris and other materials which undergo a hydration reaction during hardening.

The aqueous coating composition of the present invention may be applied to a number of different concrete-like structures. For example, highway pavement, airport runways, parking garage surfaces, curbs and gutters, commercial floors and formed concrete and bridge constructions can all be coated with the aqueous coating composition of the present invention during the curing period in order to ensure the development of maximum strength and wear resistance in the concrete-like material during curing.

Representative non-limiting examples of the hydrocarbon waxes of the present invention include paraffin wax, slack wax, microcrystalline wax, olefin waxes and other conventional, known hydrocarbon waxes. More preferred hydrocarbon waxes are those made up of relatively high molecular weight components since such waxes tend to exhibit better film-forming properties. The most preferred hydrocarbon wax for use in the present invention is a high molecular weight paraffin wax.

The aqueous coating composition of the present invention comprises 5.0–45.0% by weight, based on the total weight of the composition, of the hydrocarbon wax. More preferably, the aqueous coating composition of the present invention comprises 10–35% by weight of the hydrocarbon wax and, most preferably, the aqueous coating composition of the invention comprises 15–25% by weight of the hydrocarbon wax. Of course, mixtures of one or more hydrocarbon waxes may also be employed in the aqueous coating composition.

In addition to water and the hydrocarbon wax, the aqueous coating composition of the present invention comprises an emulsifying agent such that the aqueous composition forms an emulsion in water which can be applied to the surface of a concrete-like material. The emulsifying agents useful in the present invention are the polyvinyl alcohols. Any form of polyvinyl alcohol may be employed in the present invention irrespective of its degree of hydrolysis and/or degree of polymerization. However, the degree of hydrolysis and/or degree of polymerization of the polyvinyl alcohol may have an impact on the strength of the film which is formed from the aqueous coating composition of the present invention, as well as the case with which the film can be removed from the concrete-like material after curing is complete. Accordingly, the specific polyvinyl alcohol to be used in the present invention may be selected on the basis of which polyvinyl alcohol provides the best properties in terms of film strength and easy removal of the film upon curing.

The polyvinyl alcohol emulsifying agent is employed in an amount of 1.0–10.0% by weight, based on the total weight of the aqueous coating composition. More preferably, the polyvinyl alcohol emulsifier comprises 2–5% by weight and, most preferably, 2–4.5% by weight, based on the total weight of the composition. Of course, mixtures of two or more polyvinyl alcohols having differing degrees of hydrolysis and/or polymerization may be employed in the aqueous coating composition of the present invention.

The aqueous coating composition of the present invention may also optionally include up to 1.0% by weight of a biocide, based on the total weight of the composition. Such biocides are known in the art and include pesticides and other materials designed to prevent the growth of organisms in the aqueous coating composition during storage and use. The biocide will typically be employed in an amount sufficient to prevent the growth of living organisms in the aqueous coating composition during storage. Such amounts generally do not exceed 1.0% by weight and, more preferably, only up to 0.5% by weight of the biocide is employed. Most preferably, the biocide comprises up to 0.10% by weight of the aqueous coating composition. An example of a suitable biocide for use in the present invention is Proxell GXL®.

In an alternative embodiment of the present invention, the aqueous coating composition further comprises a light reflective pigment. The light reflective pigment provides a coating which minimizes undesirable solar heating of exposed surfaces of the concrete-like material and provides an easy manner to inspect the surface of the concrete-like material to ensure that it has been completely coated by the aqueous coating composition of the invention. It is important to minimize undesirable solar heating of concrete-like materials during curing since heating of the material will tend to increase the vaporization of water from the concrete-like material thereby reducing the amount of water available for the hydration reaction required for hardening.

Light reflective pigments which may be employed in the aqueous coating composition of the invention include metal oxides, metal carbonates, metal sulfates and mixtures thereof. For example, titanium dioxide pigment may be employed in order to provide a white, light reflective film atop a concrete-like material when the coating composition is applied thereto.

In addition, the aqueous coating composition of the invention may optionally contain one or more filler materials. Any conventional filler material may be employed for this purpose.

Generally, if a light reflective pigment and/or one or more filler materials are employed in the aqueous coating composition of the invention, the total of the filler materials and light reflective pigment will comprise 1.0–20.0% by weight of the aqueous coating composition. More preferably, the total of the filler materials and light reflective pigment material comprises 2–10% by weight of the aqueous coating composition and, most preferably, the total of the filler materials and light reflective pigment comprises 2–5% by weight, based on the total weight of the aqueous coating composition.

The aqueous coating composition of the present invention may also include other, conventional materials employed in such coating compositions. In addition, in some applications it may be advantageous to incorporate a small amount of an ultraviolet indicator in the composition in order to help ensure that all the product is removed from the cured material after cure is complete. Amounts of ultraviolet indicator of up to 1.0% by weight, based on the total weight of the composition, may be employed. Preferably, about 0.1% by weight of ultraviolet indicator is used.

The aqueous coating composition of the invention may be made by mixing the ingredients using a conventional mixing apparatus. If a prolonged storage period is anticipated, it is preferable to run the aqueous coating composition through a homogenizer before putting it in the storage container. The aqueous coating composition of the invention is storage stable although for prolonged storage periods of six months or more, it is advisable to include up to 1.0% by weight of a biocide in the aqueous coating composition in order to prevent the growth of undesirable organisms.

In a second aspect, the present invention relates to a method of coating a material which undergoes an hydration reaction during hardening in order to reduce the loss of water vapor from the material during the hardening period. This method of using the aqueous coating composition of the invention comprises the step of applying to the surface of the concrete-like material a coating of the aqueous coating composition described above.

The application rate for the coating composition of the invention is typically 1.0–10.0 $m^2/L$. The application rate will vary within this range depending upon the exact composition of the coating composition, the desired thickness of the coating, and the climatic conditions under which the coating will be employed. The coating of the present invention is generally allowed to harden and remain on the surface of the concrete-like material for a period of 3–30 days. The coating should be allowed to remain in place at least until the concrete-like material is fully hardened since the purpose of the coating is to prevent the loss of water vapor during hardening of the concrete-like material.

The aqueous coating composition of the present invention can be applied in any conventional manner. For example, the coating can be applied using spray guns, rollers or brushes.

The aqueous coating composition of the invention meets the ASTM C-309 specification for coating concrete-like materials to enhance curing. The aqueous coating composition of the present invention also meets the Army Corps of Engineers specification CRD C300, the FAA specification and various state DOT specifications.

More importantly, in addition to meeting all of the foregoing specifications, the aqueous coating composition of the present invention also meets Federal Air Quality Regulation 40 C.F.R. §52.254. This is significant since conventional, commercially available coatings which are used for the same purpose as the coating of the present invention typically do not meet this Federal Air Quality regulation since they usually contain hazardous components and/or volatile organic compounds. Accordingly, the aqueous coating composition of the present invention represents a major advance in the environmental friendliness of these types of coating materials.

In addition to being non-toxic and containing no volatile organic compounds, the aqueous coating composition of the present invention is easy to clean up and is non-yellowing. Further, since the aqueous coating composition of the invention forms a coating which is impervious to water vapor, the coated concrete-like material cures to its full strength potential since it retains its moisture during curing. Finally, the coating obtained by the method of the present invention is easily removed from the concrete once curing is complete by, for example, use of non-volatile solvents. Alternatively, the coating can be allowed to dissipate on its own. Typically, this will occur in less than 60 days if the coating is on a surface exposed to the environment.

In a third aspect the present invention relates to an article of manufacture which comprises a material which undergoes an hydration reaction during hardening, and having applied thereto a sufficient amount of a coating to reduce the loss of water vapor from the material. The coating comprises the coating of the present invention as described above.

The following examples are provided to further illustrate embodiments of the present invention.

Materials Employed in the Examples

Hydrocarbon Wax: Ashland™ high molecular weight petroleum wax.

Polyvinyl Alcohols:

Airvol™ 107—polyvinyl alcohol with a 98–99% degree of hydrolysis.

Airvol™ 205—polyvinyl alcohol with an 87–89% degree of hydrolysis.

Biocide: Proxell GXL™.

EXAMPLES 1–2

An aqueous coating composition in accordance with the invention was prepared from 70% by weight of water, 27.5% by weight of hydrocarbon wax and 2.5% by weight of polyvinyl alcohol grade 205 emulsifying agent. The product was processed in a mixing tank, run through a laboratory blender and stored in a storage tank. The resultant product was a white, milky liquid which dries to a clear film upon application to concrete.

This product was tested in accordance using the State of North Carolina Department of Transportation testing method for membrane curing compounds. In general, the aqueous coating composition was applied at an application rate of approximately one gallon per 400 square feet to an uncured concrete material. The coated concrete was allowed to stand for 72 hours in a cabinet at 100° F. and 30% relative humidity. The coating had a solids content of 31% by weight and a specific gravity of 0.976 grams per $cm^2$.

After 72 hours, it was found that only 0.003 grams/$cm^2$ of water were lost from the concrete material. As a result, the product was within the State of North Carolina Department of Transportation specifications.

The same test was run on a composition containing 25.6% by weight of hydrocarbon wax, 2.9% by weight of polyvinyl alcohol grade 205 emulsifying agent, 4.4% by weight of titanium dioxide pigment and 67.1% by weight of water. This material was also found to be within the State of North Carolina Department of Transportation Specifications.

EXAMPLES 3–5

Three different aqueous compositions was made in the same manner as in Example 1 using the following ingredients:

Example 3—This composition contained 29.5% by weight of hydrocarbon wax, 2.5% by weight of polyvinyl alcohol grade 205 emulsifying agent and 68% by weight of water.

Example 4—This composition contained 28.5% by weight of hydrocarbon wax, 3.5% by weight of polyvinyl alcohol grade 205 emulsifying agent, and 68% by weight of water.

Example 5—This composition contained 21% by weight of hydrocarbon wax, 2.5% by weight of polyvinyl alcohol grade 205 emulsifying agent, 2.5% by weight of polyvinyl alcohol grade 107 emulsifying agent, 6% by weight of titanium dioxide pigment and 68% by weight of water.

These compositions all had a solids content of 32%. The compositions of examples 3–5 were tested in accordance with ASTM C 156-94 "Water Retention By Concrete Curing Materials". The tests were run according to the ASTM method with the exception that the mortar specimens were 150 mm in diameter and 35 mm deep.

One pint of each sample was applied at an application rate of 200 square feet per gallon using a sprayer. The samples were applied to Essroc brand cement having mortar proportions (W:C:S) of 0.4:1.0:2.5.

The aqueous coating composition weighed 8.10 pounds per gallon. Three different specimens were coated for each example and the average weight loss after 72 hours was only 0.03 kg/m$^2$ per specimen. As a result, the product met the ASTM specification.

EXAMPLE 6

An aqueous composition was made in accordance with the procedure of Example 1 except that the aqueous coating composition was processed with a homogenizer rather than a laboratory blender and a coating having the following composition was employed: 27.5% by weight of hydrocarbon wax, 2.5% by weight of polyvinyl alcohol grade 205 emulsifying agent, 0.2% by weight of biocide and 69.8% by weight of water.

A concrete sample was coated and placed for 72 hours in a cabinet at 100° F. and 34% relative humidity. The average weight loss of the specimen was only 0.028 grams/cm$^2$. This product also met the North Carolina Department of Transportation specification for these materials.

EXAMPLES 7–9

An aqueous composition was made in the same manner as in Example 6 using the following ingredients:

Example 7—This composition contained 28.25% by weight of hydrocarbon wax, 1.25% by weight of polyvinyl alcohol grade 205 emulsifying agent, 1.5% by weight of polyvinyl alcohol grade 107 emulsifying agent and 70% by weight of water.

Example 8—This composition contained 23.25% by weight of hydrocarbon wax, 2.25% by weight of polyvinyl alcohol grade 205 emulsifying agent, 1.5% by weight of polyvinyl alcohol grade 107 emulsifying agent, 3.0% by weight of titanium dioxide pigment and 70% by weight of water.

Example 9—This composition contained 21.24% by weight of hydrocarbon wax, 1.26% by weight of polyvinyl alcohol grade 205 emulsifying agent, 2.1% by weight of polyvinyl alcohol grade 107 emulsifying agent, 2.8% by weight of titanium dioxide pigment and 72.6% by weight of water.

These compositions were tested in accordance with ASTM C 156-94 "Water Retention By Concrete Curing Materials". The tests were run according to the ASTM method with the exception that the mortar specimens were 150 mm in diameter and 35 mm deep.

One pint of each sample was applied at an application rate of 200 square feet per gallon using a sprayer. The samples were applied to Essroc brand cement having mortar proportions (W:C:S) of 0.4:1.0:2.5.

Three different specimens were coated with the composition of each example and the average weight loss per speciment after 72 hours was only 0.12 g/cm$^2$. As a result, the products met the ASTM specification.

EXAMPLE 10

An aqueous coating composition was prepared using the procedure of Example 6 except that an aqueous coating composition having the following composition was employed.

25.3% by weight of hydrocarbon wax, 2.0% by weight of polyvinyl alcohol grade 205 emulsifying agent, 2.0% by weight of polyvinyl alcohol grade 107 emulsifying agent, 4.5% by weight of titanium dioxide pigment, 0.2% by weight of biocide and 66% by weight of water.

A concrete sample was coated and placed for 72 hours in a cabinet at 100° F. and 34% relative humidity. The average weight loss after 72 hours was determined to be 0.028 grams/cm$^2$. This product also met the North Carolina Department of Transportation specification for these materials.

EXAMPLE 11

A lower solids aqueous coating composition was prepared in accordance with the procedure of Example 6 having the following composition:

9.3% by weight of hydrocarbon wax, 1.6% by weight of polyvinyl alcohol grade 205 emulsifying agent, 0.6% by weight of polyvinyl alcohol grade 107 emulsifying agent, 3.5% by weight of titanium dioxide pigment and 85% by weight of water.

This product was tested in accordance with the test procedure of Examples 7–9 and the test results were about the same thereby indicating that this composition met the ASTM specification.

EXAMPLE 12

A lower solids aqueous coating composition was prepared in accordance with the procedure of Example 6 having the following composition:

20.5% by weight of hydrocarbon wax, 3.5% by weight of polyvinyl alcohol grade 203 emulsifying agent having a degree of hydrolysis of about 87–89% and 76% by weight of water.

This product was tested in accordance with the test procedure of Examples 7–9 and the test results were about the same thereby indicating that this composition met the ASTM specification.

The foregoing examples have been presented for the purpose of illustration and description only and are not to be construed as limiting the invention in any way. The scope of the invention is to be determined from the claims appended hereto.

I claim:

1. A method of reducing the loss of water vapor from a material which undergoes a hydration reaction during its hardening period comprising:

applying to the surface of an uncured material which undergoes a hydration reaction a coating of an aqueous composition comprising polyvinyl alcohol, a hydrocarbon wax, and the balance of water, said hydrocarbon wax and polyvinyl alcohol being present in a ratio of 3:1 to 35:1, said coating being applied at an application rate of 1.0–10.0 m$^2$/liter; and allowing said coating to remain in place at least until said material is fully hardened.

2. The method according to claim 1 wherein said aqueous composition comprises 1.0–10.0% by weight of said polyvinyl alcohol and 10.0–35.0% by weight of said hydrocarbon wax based on the total weight of the composition.

3. The method according to claim 2 wherein the aqueous composition further comprises up to 1.0% by weight, based on the total weight of the composition, of an ultraviolet indicator.

4. The method according to claim 2 wherein the aqueous composition further comprises 1.0–10.0% by weight of a filler material, based on the total weight of the composition.

5. The method according to claim 2 wherein the aqueous composition further comprises 1.0–10.0% by weight of a light reflective pigment, based on the total weight of the composition.

6. The method according to claim 5 wherein the light reflective pigment is selected from the group consisting of metal oxides, metal carbonates, metal sulfates and mixtures thereof.

7. The method according to claim 6 wherein the light reflective pigment comprises titanium dioxide.

8. The method according to claim 1 wherein the aqueous composition comprises an emulsion.

9. The method according to claim 1 wherein the aqueous composition comprises 2–5% by weight of polyvinyl alcohol, 15–30% by weight of a hydrocarbon wax, 0–1.0% by weight of a biocide, based on the total weight of the composition and the balance of water.

10. The method according to claim 9 wherein the aqueous composition comprises 2–4.5% by weight of polyvinyl alcohol, 16–26% by weight of a hydrocarbon wax, 0–0.5% by weight of a biocide, based on the total weight of the composition, and the balance of water.

11. The method according to claim 1 further comprising the steps of hardening the coating and removing the hardened coating after a period of 3–30 days.

12. The method according to claim 1 wherein the hydrocarbon wax is selected from the group consisting of paraffin wax, slack wax, microcrystalline wax, waxy materials containing an olefin, and mixtures thereof.

13. The method according to claim 1 wherein the aqueous composition further comprises a biocide.

14. The method according to claim 1 wherein the material which undergoes a hydration reaction during hardening is selected from the group consisting of concrete, gypsum-based products and plaster of paris.

* * * * *